P. L. ROBERTSON.
CHUCK.
APPLICATION FILED JUNE 2, 1911.
1,052,091.
Patented Feb. 4, 1913.
2 SHEETS—SHEET 1.
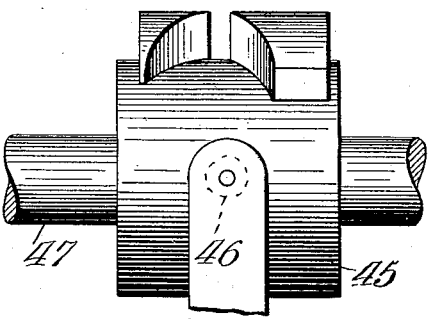
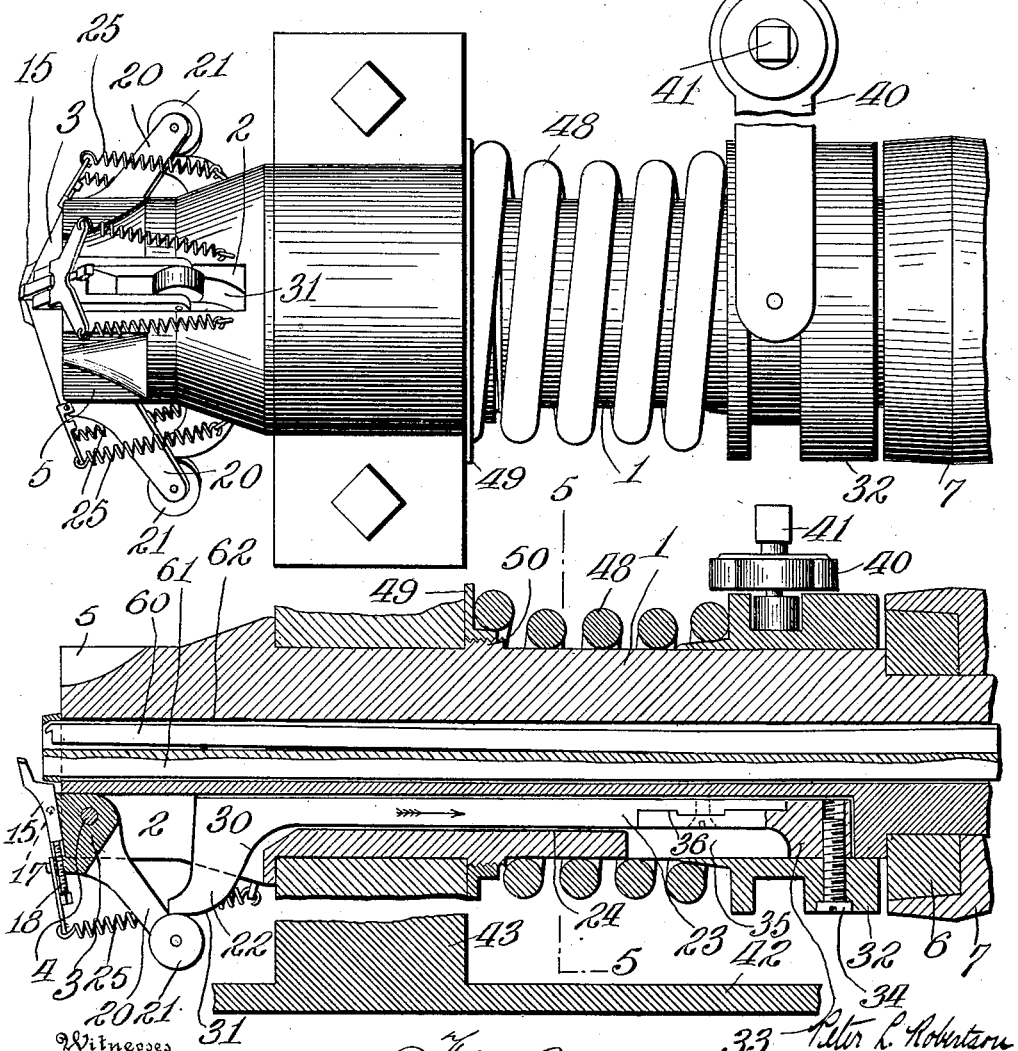
Fig. 1.
Fig. 2.
Witnesses
Peter L. Robertson
Inventor
By Attorney P. L. ROBERTSON.
CHUCK.
APPLICATION FILED JUNE 2, 1911.
1,052,091.
Patented Feb. 4, 1913.
2 SHEETS—SHEET 2.
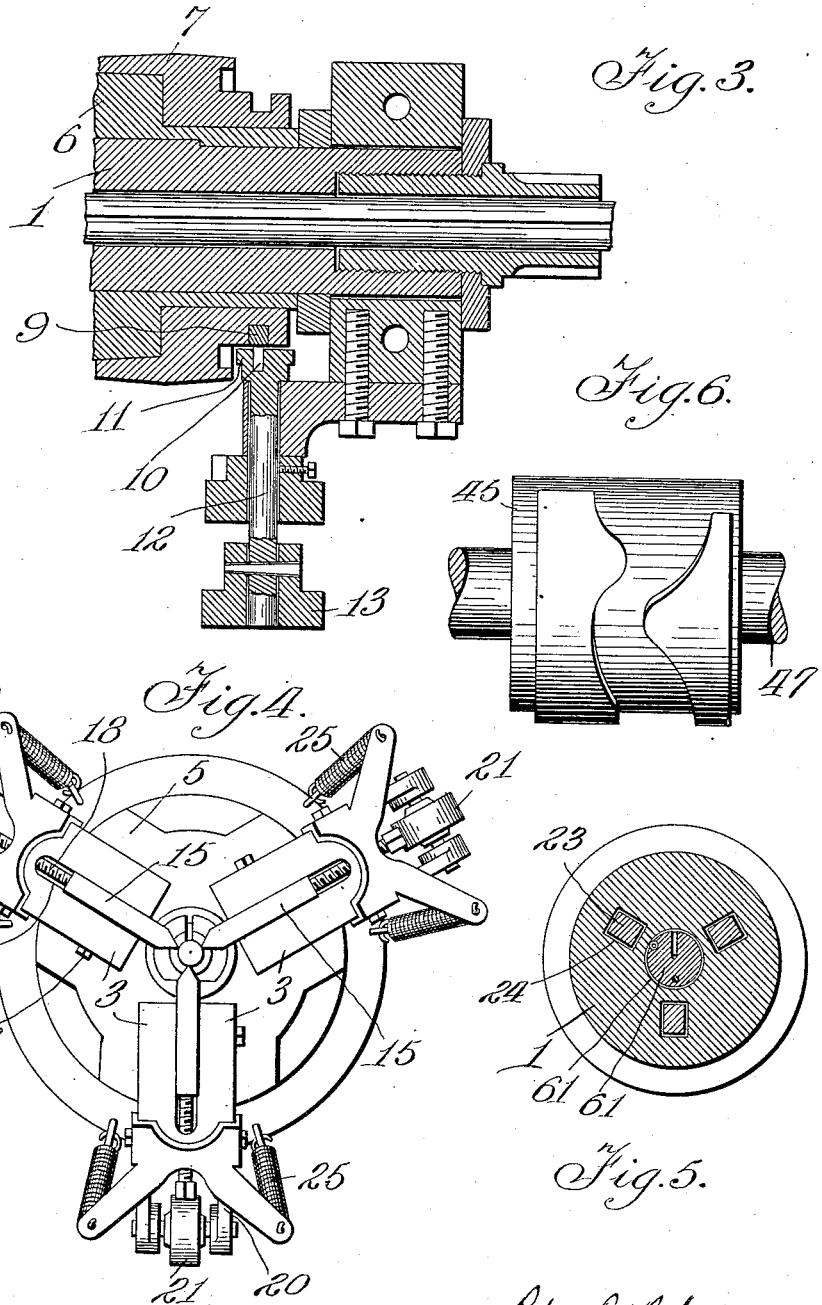

UNITED STATES PATENT OFFICE.

PETER L. ROBERTSON, OF MILTON, NEAR HAMILTON, ONTARIO, CANADA.

CHUCK.

1,052,091. Specification of Letters Patent. Patented Feb. 4, 1913.

Original application filed December 27, 1910, Serial No. 599,548. Divided and this application filed June 2, 1911. Serial No. 630,889.

*To all whom it may concern:*

Be it known that I, PETER LYMBURNER ROBERTSON, of Milton, near Hamilton, Province of Ontario, Canada, have invented certain new and useful Improvements in Chucks; and I do hereby declare that the following is a full, clear, and exact description of the same.

The invention forming the subject matter of this application, which is a divisional part of application Serial No. 599,548, filed Dec. 27, 1910, is especially adapted for application to screw machines, and it has for its object to provide a simple construction for a chuck with particular reference to facilitating the operation upon screw blanks or the like.

Other objects and the advantages of the invention will be apparent to those skilled in the art from a consideration of the following description and accompanying drawings forming a part of this specification in which one embodiment of the invention has been described and illustrated and in which similar reference characters indicate the same parts and wherein—

Figure 1 is a plan view of my improved chuck. Fig. 2 is a longitudinal vertical axial section thereof. Fig. 3 is a horizontal axial sectional view of the rear part of the chuck spindle showing the means whereby it is rotated. Fig. 4 is a front view of the chuck. Fig. 5 is a detail transverse vertical section taken on line 5—5 Fig. 2, and Fig. 6 is a detail side elevation of the cam for operating the chuck jaws.

My improved chuck comprises briefly a spindle having a plurality of jaws operated by devices spaced inwardly from the periphery of the spindle and outwardly from the axis thereof. The chuck spindle is shown at 1 and as shown here is formed to present at its forward end three equally spaced and radially disposed slots 2 in which the gripping members or jaws 3 are located, these jaws being pivoted on pins 4 supported in lugs 5 on the spindle.

The means here indicated for rotating the chuck spindle comprises a chuck consisting of a member 6 tight upon the spindle 1 and a loose member 7 adapted to be driven by a belt not shown passing over the periphery thereof, and to be shifted by a shifter 9 engaging in an annular groove therein and having an integral pin 10 engaging a crank disk 11 on the end of a spindle 12 provided on its opposite end with a handle or knob 13 this clutch having been made the subject matter of an application Serial No. 630,891, filed by me June 2, 1911, and forming a divisional part of the above mentioned application No. 599,548.

Each of the jaws 3 is provided with an adjustable die 15 secured in a radial slot 16 by a set screw 17, a second screw 18 providing an abutment for the rear end of the tooth these dies being provided so that the gripping faces of the jaws may be easily " trued up." Formed integrally with the jaws are rearwardly extending arms 20 having mounted at their ends rollers 21 adapted to be engaged to open the jaws by means of cams 22 formed on the ends of reciprocating bars 23 slidable in borings 24 in the spindle 1 these borings communicating with and forming rearward extensions of the slots 2 into which the ends of the bars 23 which carry the cams project, springs 25 connecting the jaws to the spindle.

When the bars are reciprocated in the direction indicated by the arrow in Fig. 2 the jaw will close, and when reciprocated in the opposite direction the springs 25 will open the jaws. I prefer to form each of the cams, as shown, with the part 30 thereof, which engages the roller 21 when the jaws are just commencing to close with a pronounced rise to give a relatively rapid movement to the jaws while the parts 31 of the cams which engage the rollers when the jaws are nearing closed position have a relatively small rise to cause the jaws to be held firmly closed upon the blank.

The bars 23 are operated from a sleeve 32 slidable on the spindle 1 and having the thickened ends 33 of the bars fastened thereto, by set screws 34 or otherwise, slots 35 in the spindle accommodating the ends 33 while the bars are formed in two parts jointed together as at 36 to permit of their insertion in place.

The sleeve 32 is operated to open the jaws by an oscillatory lever 40 fulcrumed as at 41 to any suitable fixed part as the bed plate, a portion of which is indicated at 42, upon which the spindle is shown mounted, bearings for the spindle being indicated at 43, the construction above described enabling the spindle to have supporting bearings located close to the head thereof. Lever 40 is oscillated by a double face cam 45 engaging a roller 46 carried by the end of the lever, the cam being mounted upon a shaft 47 upon the bed plate 42 and driven by any suitable means not shown. A spring 48 encircling the spindle 1 and bearing between a collar 49, threaded on an annular flange 50 in the spindle and the sleeve 32 acts to close the jaws when the cam releases the latter.

The shaving tool indicated at 60 carried by the rod 61 in the axial boring 62 in the spindle 1 forms no part of the present invention but has been fully described and claimed in application No. 599,548, above referred to.

It is believed that the operation of the chuck has been clearly set forth in the foregoing specification and no further description thereof is deemed necessary.

Claims:

1. A chuck comprising in combination, a chuck spindle formed with a plurality of longitudinally extending borings spaced between the periphery and the axis thereof, reciprocating bars located within the said borings, a series of jaws movably mounted on the spindle, means operatively connecting one end of each of the said reciprocatory bars to respective jaws, and operating mechanism connected to the opposite ends of the said bars.

2. A chuck comprising in combination, a chuck spindle formed with longitudinal grooves, and with longitudinally extending borings spaced between the periphery and axis of the spindle and communicating at their forward ends with such grooves, a plurality of jaws located in the grooves and pivoted to the spindle, such jaws being formed with rearwardly extending arms, rollers carried by said arms, a plurality of reciprocatory bars located in the said borings, and formed with cams adapted to engage the said rollers, and means for operating the said bars.

In testimony whereof, I have signed my name to this specification, in the presence of two subscribing witnesses.

PETER L. ROBERTSON.

Witnesses:
H. M. CHRISTMAN,
D. S. TOVELL.

---

Copies of this patent may be obtained for five cents each, by addressing the "Commissioner of Patents, Washington, D. C."